United States Patent [19]

Lukach

[11] 4,314,471
[45] Feb. 9, 1982

[54] METAL EXTRUSION PRESS-BILLET LOADER

[75] Inventor: Danil Lukach, Rochester, N.Y.

[73] Assignee: USM Corporation, Farmington, Conn.

[21] Appl. No.: 120,537

[22] Filed: Feb. 11, 1980

[51] Int. Cl.³ .............................................. B21C 33/00
[52] U.S. Cl. ...................................... 72/270; 72/422; 414/618
[58] Field of Search ................ 72/270, 419, 420, 422, 72/361; 294/101, 103 R; 414/618, 680; 269/156; 82/38 R, 39, 45, 2.5; 29/406, 283

[56] References Cited

U.S. PATENT DOCUMENTS 2,900,090 8/1959 Sack ....................................... 72/420
4,227,390 10/1980 Schoenenberger ....................... 72/4

Primary Examiner—Lowell A. Larson
Attorney, Agent, or Firm—Donald N. Halgren

[57] ABSTRACT

A billet loader for an extrusion press having simple premeasured adjustment capabilities facilitating the sequential loading of different diameter billets into a billet container therewith without requiring difficult realignment adjustments. The billet loader comprises a head having a pair of angled support surfaces, with a third adjustable support arm therebetween, permitting simple adaptability to a plurality of billet diameters. The head also includes a shearable connection with its support arm to minimize damage in case of loader malfunction.

7 Claims, 4 Drawing Figures

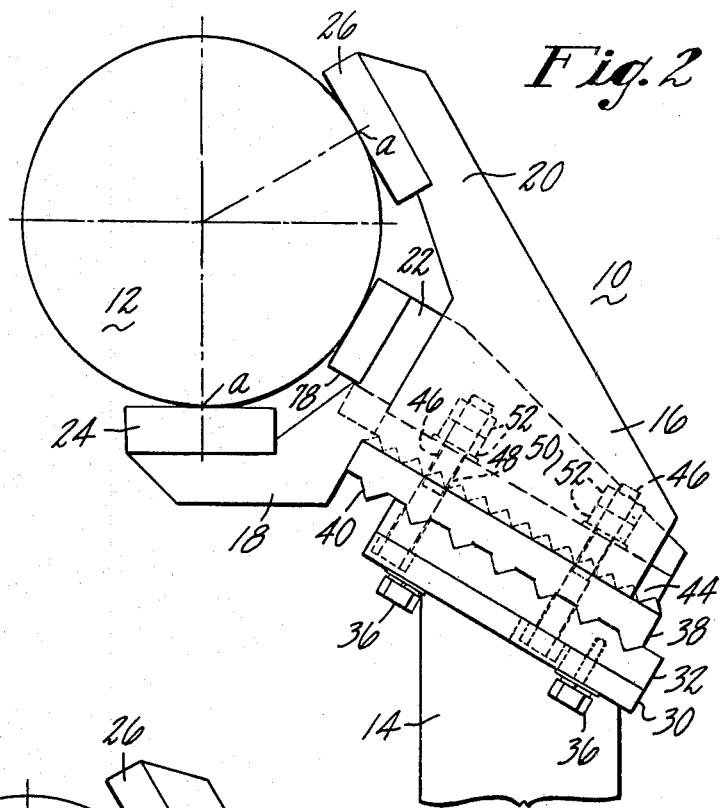
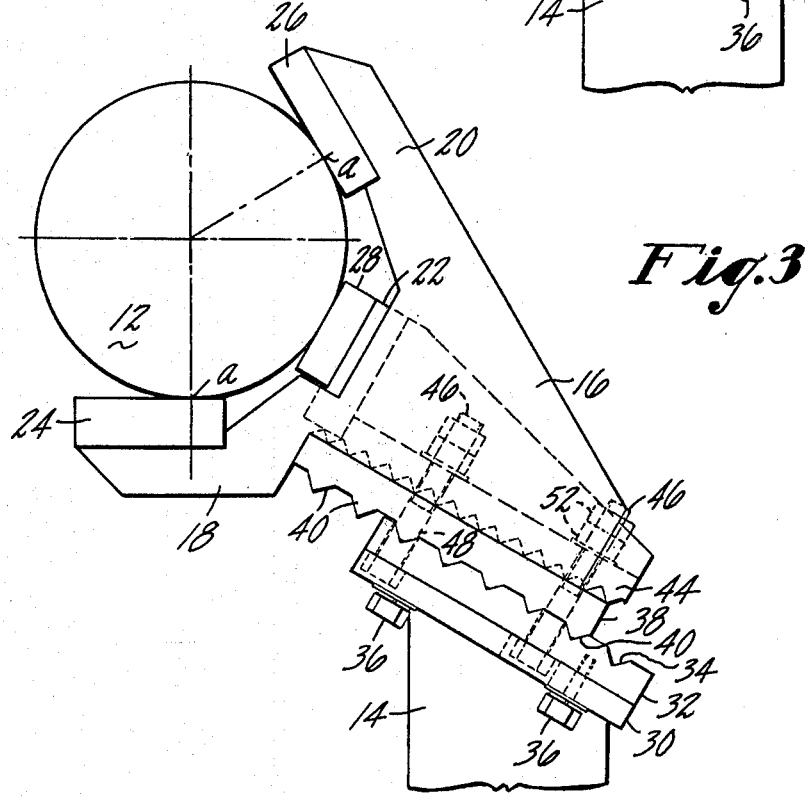

METAL EXTRUSION PRESS-BILLET LOADER

BACKGROUND OF THE INVENTION

(1) Field of the Invention

The invention relates generally to metal handling machinery and more particularly to billet loading mechanisms on extrusion press machines.

(2) Prior Art

An extrusion press is utilized to force a heated metal slug or billet through a shaped orifice called a die. The die may be mounted on a carrier supported on a horizontal track adjacent a massive vertically arranged plate, permitting the changing of die shapes and sizes as production requires. The diameter of the billets which are forced through the dies are changed as production requirements change, and the container for holding and maintaining heat in the billets during their extrusion also must be changed as those requirements change. The billets, which are heated to temperatures of about 1200° must be transferred from a heated billet source to coaxial alignment with the container in a smooth and efficient manner, to minimize heat loss and eliminate damage to the container, to the billet loader and/or to the billet and its associated dummy block.

The billet loaders must be adjusted to the proper size when the billet diameters are changed in order to accommodate the alignment changes with the container and to permit proper functioning thereof. The billet loaders get hot from transferring the hot billets from the billet source to the billet container. This makes the adjustment thereof very difficult, which is usually done with a plurality of adjustable screws arranged in the loader head, the proper readjustment of which takes considerable time, and which adjustment means get dirtied by hot metal scraps. The billet loaders of the prior art also have to be realigned each time to permit the axis of the container to closely line-up with the axis of the dummy block and the billet, or else the container would be damaged during loading thereof.

It is thus an object of the present invention, to provide a billet loader for an extrusion press which is simple and efficient to operate and adjust.

It is a further object of the present invention to provide a billet loader for an extrusion press which provides for prealignment of the billets with respect to the axis of the container.

It is yet a further object of the invention to provide a billet loader with means for minimizing damage to itself and the extrusion press in case of a control or guidance malfunction therein during the loading or alignment operation.

BRIEF SUMMARY OF THE INVENTION

The present invention comprises an adjustable billet loader for an extrusion press having a V-shaped head comprising a pair of support arms each with a support surface thereon. The support surfaces each define planes that when extended, may intersect one another at an angle of 60°. A third support arm is adjustably arranged between the pair of support arms and is movable in incremental units towards and away from the longitudinal axis of the billet to facilitate dimensional changes in the diameters of billets carried therewith. The whole V-shaped head is incrementally adjustable with respect to a support plate on the distal end of a loader arm, permitting preadjustment of the billet loader, allowing alignment of billets with respect to the container in the extrusion press. The preadjustment capabilities are comprised of an array of intermating parallel notches which permits the third support arm incremental movement thereof with respect to the other support arms, and an array of intermating parallel notches between the contiguous faces of the support arm and the billet loader arm also facilitating incremental adjustment therebetween. The notches in the support arms and the loader arm may effectively be replaced by an orderly array of orifii and pins interdigitated therewith to permit the prealigned adjustment capatilites therebetween. The V-shaped head is aligned with a plate which is secured to the support plate on the billet loader arm by a plurality of shear bolts which permit the head to be harmlessly sheared off from the billet loader arm if the loader or process control mechanism accidentally malfunctions, of if other interacting press components accidentally interfere with loader operation when the loader head is raised, lowered or held in a fixed position.

BRIEF DESCRIPTION OF THE DRAWINGS

The objects and advantages of the present invention will become more apparent when viewed in conjunction with the following drawings, in which:

FIG. 2 is a side elevational view of a billet loader head adjusted to hold an intermediate diameter billet therein;

FIG. 3 is a side elevational view of a billet loader head adjusted to hold a small diameter billet therein.

DESCRIPTION OF THE PREFERRED EMBODIMENTS

Figure 1:
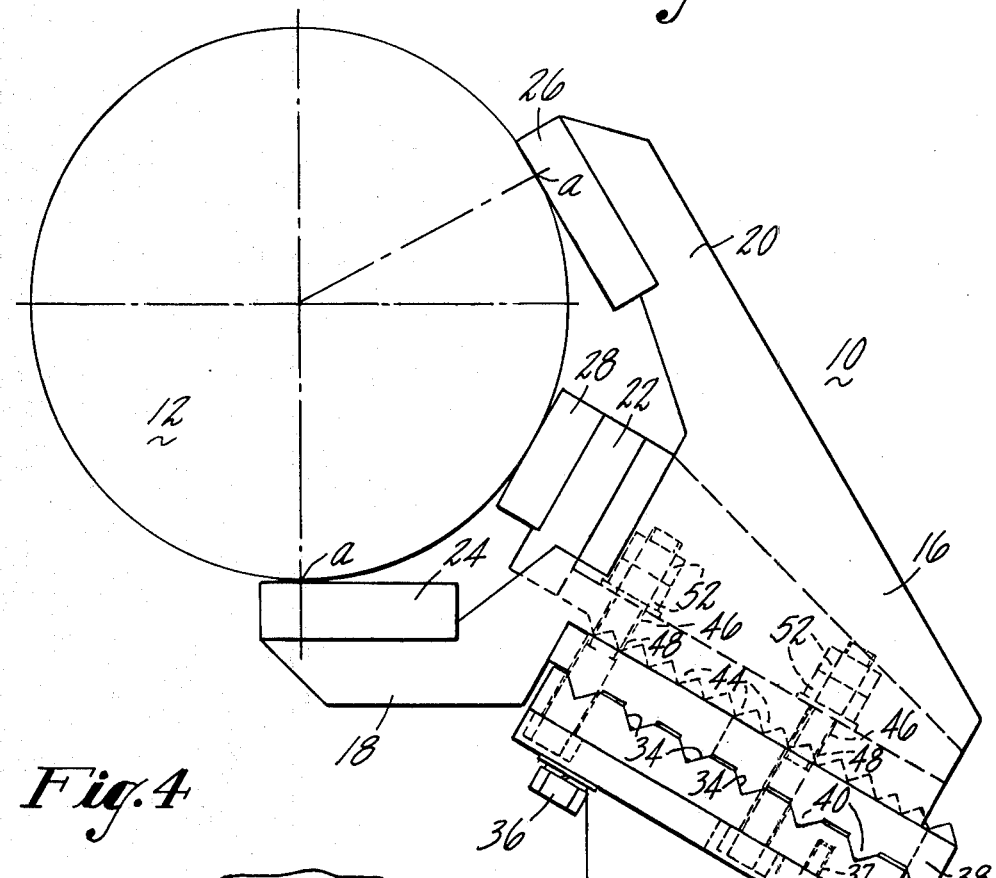
FIG. 1 is a side elevational view of a preadjustable billet loader head with a large diameter billet therein.

Referring now the drawings in detail, and particularly to FIG. 1, there is shown a billet loader 10, utilizable to load hot metal slugs or billets 12, into a machine, such as an extrusion press, not shown. The billet loader 10 comprises a movable lifting arm 14, which may be extendable from and pivotable about a lower axis, not shown, through means such as pressurizable cylinders and associated linkages known in the art. The billet loader 10 of the present invention also includes a head 16 which comprises a first support arm 18, a second support arm 20, and an intermediate support arm 22. Each arm 18, 20 and 22 has a planar faceplate 24, 26 and 28 secured respectively thereto. An end plate 30, is secured to the distal end of the movable lifting arm 14, by welding or similar means. A mating support plate 32, in one embodiment, has a plurality of parallel notches 34 thereacross for purposes discussed below, said mating support plate 32 being attached to the end plate 30 by a plurality of shear bolts 36, each shear bolt 36 having a relatively thin shank 37. Each shank 37 is of thin diameter to permit shearing thereof in case of maladroit directional movement of the machine billet loader 10 caused by machine or operator error, whereby serious damage to the machine or the head 16 may be prevented during a collision therebetween.

The head 16 has an overall V-shaped configuration as viewed from the side and has an outer portion which comprises a first adjustment plate 38 which may be of rectangular configuration normal to the plane of the drawings and having a plurality of parallel first ribs 40 arranged thereacross. The ribs 40 are fixed and spaced so as to matably fit into the notches 34 on the support plate 32. The first adjustment plate 38 has a parallel array of small ribs 42 on the side opposite the first ribs 40, and the intermediate support arm 22 has one side with a corresponding parallel array of small mating ribs 44 which fit into the notches between the small ribs 42. It is to be noted that the ribs and notches may be of other non-parallel configurations and still be consistent with the scope of this invention.

A plurality of bolts 46, only two being shown, extend through an arrangement of bores 48 in the support plate 32 and into an arrangement of elongated slots so disposed within the first adjustment plate 38 and the base portion of the intermediate arm 22. The bolts 46 have a plurality of nuts 52 secured to their threaded ends, holding the intermediate arm 22 to the first and second arm 18 and 20, and to the support plate 32, through the intermating notches and ribs.

Each billet 12 has a longitudinal axis and each faceplate 24, 26 and 28 contacts the curvilinear surface of each billet 12, in a line which is parallel with that axis. Changing the diameter of the billet 12 would cause a change in the position of the line of contact on the faceplates 24 and 26, indicated as points a, b and c in FIGS. 1, 2 and 3, respectively. The intermediate support arm 22 may be movable as for instance, toward and away from the axis of each billet 12 by a loosening of the nuts 52 and sliding the intermediate support arm 22 therealong, towards or away from the longitudinal axis of the billet 12 as necessary. As the diameter of each billet 12 is changed, the intermediate support arm 22 may be moved with respect to the first adjustment plate 38 and/or the mating support plate 32 shearably attached to the distal end of lifting arm 14. The surface of the faceplates 24 and 26 will be tangent to the cylindrical surface of the billets 12 regardless of the diameter thereof, the point of tangency depending upon the billet diameter as indicated above as well as on the adjusted location of the faceplate 28 of the intermediate support arm 22.

Figure 4:
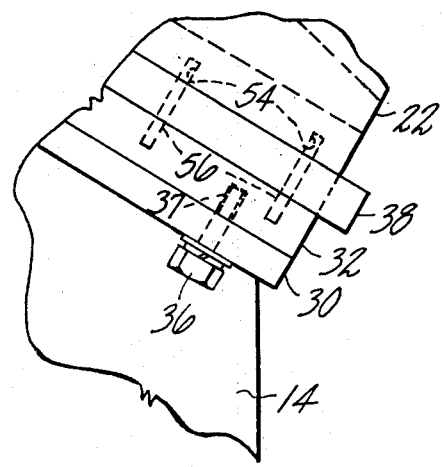
FIG. 4 is a partial side view of the billet loader head utilizing an alternative adjustment means.

The support arms 18, 20 and 22 may be adjustably arranged with respect to one another and to the lifting arm 14, by a further embodiment, alluded to above, wherein the support plate 32, the first adjustment plate 38, and the underside of the intermediate support arm 22 are of planar configuration, that is, they do not have grooves or notches thereon to facilitate securable preadjustment therebetween, but they each may have a premeasured arrangement of bores 54 thereon, which bores 54 extend partway through the upper surface of the support plate 32, completely through the first adjustment plate 38, and at least partway into the bottom side of the intermediate support arm 22, as shown in FIG. 4. An array of pins 56 extend into at least some of the bores 54 in the support plate 32, through the first adjustment plate 38, and into the bored surface of the intermediate support arm 22. Lifting the head 16 from the pins 56 in the support plate 32 and movement toward or away from the axis of the billet 12, and the replacement thereof and lifting off and subsequent movement and replacement of the intermediate support arm 22 with respect to the pins 56 effects the simple aligned preadjustment necessary to load more billets of different known diameters on the head 16. Utilization of the bolts 46 and their nuts 52 may be unnecessary in view of the locking effect of the pins 56 in their respective bores 54. Sliding of the various components with the pins 56 withdrawn and subsequently replaced after readjustment of the support arm 18, 20 and 22 comprises similar realignment effectuation.

Thus, there has been shown a billet loader 10 capable of loading hot slugs or billets 12 of alternating diameters seriatum into a processing machine wherein the billet loader 10 may be easily adjusted to conform to any alternating diameters of successive billets. The loader 10 also has safety means which minimizes the possibility of damage to the loader occuring by improper locus of motion resulting in collision with the processing machine due to equipment failure or operator error. The safety means comprising shearing bolts which yield to stress without otherwise damaging the head 16, the loader arm 14 or the processing machine itself.

Though the invention has been described with a certain degree of particularity, it is intended that the appended claims be interpreted as exemplary only and not in a limiting sense.

Having thus described my invention, what I claim as new and desire to secure by Letters Patent of the United States is:

1. A billet loader of an extrusion press machine for loading billets of varying diameters, comprising:
    a loader head mounted on a movable arm to pick-up and discharge a billet into said machine;
    said loader head having adjustable means to supportably accommodate seriatum a plurality of billet diameters therewith; and
    said adjustable means comprising at least three supports adjustably arranged with respect to said movable arm, at least one of said supports being movable with respect to the remaining pair of supports through a grooved relationship therebetween, permitting selectable aligned preadjusted stepwise carrying capacity to said loader head.

2. A billet loader of an extrusion press machine as recited in claim 1, wherein said adjustment means also comprises prealigned guides wherein said prealigned guides comprise an array of pins mating with an array of bores in contiguous portions of said loader head and said movable arm, each being movable relative to one another.

3. A billet loader on an extrusion press machine as recited in claim 1, wherein said movable arm includes a first plate thereon, and said supports include a second plate thereon, said first and second plates having said grooves disposed thereacross.

4. A billet loader of an extrusion press machine as recited in claim 1, wherein the intermediate support of said three supports is movable towards and away from the longitudinal axis of any diameter billet carried therewith.

5. A billet loader of an extrusion press machine as recited in claim 4, wherein said remaining pair of supports each have a planar support pad thereon, which at different lines of contact on their surface, are in a tangential relationship with respective different diameter billets supported therebetween.

6. A method of changing the billet alignment capabilities of a billet loading machine, comprising:
    providing an array of prealigned grooves in a movable billet loader arm;
    providing a corresponding adaptable array of grooves in a movable billet loader head;
    realigning said billet loader head utilizing said grooves thereon, with respect to said grooves on said billet loader arm, thereby providing adjusted prealigned capabilities to said billet loader head.

7. A method of changing the billet alignment capabilities of a billet loading machine as recited in claim 6, also including:

adjusting said billet loader head having an array of bores thereon, from an array of pins arranged in prealigned form on the distal end of said movable loader arm;

shifting said array of bores on said billet loader head with respect to said array of pins on the distal end of said movable loader arm; and securing said billet loader head having an array of bores thereon onto said array of pins on the distal end of said movable arm after said movement therebetween has been effected.

* * * * *